(12) United States Patent
Wyrzykowska et al.

(10) Patent No.: US 6,591,399 B1
(45) Date of Patent: Jul. 8, 2003

(54) TECHNIQUE FOR FACILITATING CIRCUITRY DESIGN

(75) Inventors: Aneta O. Wyrzykowska, Kanata (CA); Amanda L. Ellis, Kanata (CA); John H. Watkins, Ottawa (CA)

(73) Assignee: Nortel Networks Limited, Quebec (CA)

( * ) Notice: Subject to any disclaimer, the term of this patent is extended or adjusted under 35 U.S.C. 154(b) by 167 days.

(21) Appl. No.: 09/749,406

(22) Filed: Dec. 28, 2000

(51) Int. Cl.[7] .............................................. G06F 17/50
(52) U.S. Cl. ...................... 716/1; 716/2; 716/3; 716/4; 716/5
(58) Field of Search ....................... 716/1–14

(56) References Cited

U.S. PATENT DOCUMENTS

| | | | |
|---|---|---|---|
| 5,801,958 A | * 9/1998 | Dangelo et al. | ............ 364/489 |
| 5,880,971 A | * 3/1999 | Dangelo et al. | ............ 364/489 |
| 5,910,897 A | * 6/1999 | Dangelo et al. | ............ 364/488 |
| 6,407,434 B1 | * 6/2002 | Rostoker et al. | ............ 257/401 |

* cited by examiner

Primary Examiner—Vuthe Siek
(74) Attorney, Agent, or Firm—Hunton & Williams LLP

(57) ABSTRACT

A technique for facilitating circuitry design by providing minimum technology to minimize power consumption is disclosed. In one embodiment, the technique is realized by providing a system comprising estimation tools including power/density estimation tools, subsystem performance estimation tools, and performance analysis tools. Based on components and goals input by the user the system provides comparisons to facilitate minimum power consumption, maximum density, and maximum throughput. The user proceeds from a component level to a system level to arrive at an optimal system design.

36 Claims, 6 Drawing Sheets

| COMPONENT NAME | POWER (W) | QTY | COMPONENT POWER (W) | X(mm) | Y(mm) | AREA(mm^2) |
|---|---|---|---|---|---|---|
| dram | 5 | 2 | 10 | 10 | 10 | 200 |
| sdram | 6 | 4 | 24 | 5 | 8 | 160 |
| fpga | 10 | 2 | 20 | 5 | 5 | 50 |
| cdr | 1.5 | 10 | 15 | 10 | 15 | 1500 |
| TOTAL POWER | | | 69 | | | |
| TOTAL DEVICE AREA | | | | | | 1910 |

TECHNIQUE FOR FACILITATING CIRCUITRY DESIGN

FIELD OF THE INVENTION

The present invention relates generally to the design of circuit boards and circuit components and, more particularly, to a technique for facilitating the circuitry design process to minimize power consumption. Furthermore it is designed to minimize density and maximize throughput of the overall system. The tool looks into architectural trade—offs and analysis which can be implemented early in the product design cycle.

BACKGROUND OF THE INVENTION

The present state of the art in development tools includes such software tools as impedance calculators, Design ARchitecture Tool (DART), ALLEGRO, FLOWTHERM, and Sysvansis. These tools are all configured to assist a designer in designing circuitry. The tools are capable of providing system characteristics such as power, impedance, throughput, and density based on the circuit design under evaluation.

The aforementioned systems suffer from difficulties including the inability to provide alternative designs and tradeoff information associated with the alternative designs. The systems also frequently have inadequate emerging technology information to provide acceptable options. Furthermore, while prior art tools are frequently used to evaluate subsystems, system level analysis has been inadequate.

In view of the foregoing, it would be desirable to provide a technique for facilitating the design of circuit boards and circuit components which overcomes the above-described inadequacies and shortcomings. More particularly, it would be desirable to provide a technique for facilitating system design in order to provide a minimum amount of technology while simultaneously minimizing power consumption in an efficient and cost effective manner.

SUMMARY OF THE INVENTION

According to the present invention, a technique for facilitating system design including circuit board and circuit component design is provided. In one embodiment, the technique is realized by a method for facilitating circuitry design. The method comprising the step of inputting preliminary design specifications and goals into a processing system. The method further comprises the steps of predicting subsystem performance based on input design specifications and providing alternative subsystem designs based on the input goals if requested.

The method further comprise estimating power consumption based on the input design specifications and providing additional design options upon request. The method also comprises the step of providing system tradeoff and option information based on the input goals, the input design specifications, and the output of the power consumption and density estimate and the subsystem performance prediction in order to provide minimum required technology for minimizing power consumption goal.

In accordance with other aspects of the present invention, a system is provided for facilitating circuitry design. The system comprises user interface tools for allowing a user to input preliminary design characteristics and goals and at least one technology library for storing printed circuit board and component data, wherein the printed circuit board and component data include power consumption information. The system further comprises processing tools for implementation on a processor, the processing tools comprising power and density estimation tools, subsystem performance estimation tools, and system performance analysis tools.

In accordance with further aspects of the present invention, an article of manufacture for facilitating circuitry design is provided. The article of manufacture comprises at least one processor readable carrier and instructions carried on the at least one carrier wherein the instructions are configured to be readable from the at least one carrier by at least one processor and thereby cause the at least one processor to operate so as to receive input preliminary design specifications and goals into a processing system. The processor further operates on the carrier so as to predict subsystem performance based on input design specifications and provide alternative subsystem designs based on the input goals if requested and estimate power consumption and density based on the input design specifications and provide additional design options upon request. The processor also operates on the carrier to provide system tradeoff and option information based on the input goals, the input design specifications, and the output of the power consumption and density estimate and the subsystem performance prediction in order to provide minimum required technology for minimizing power consumption.

In a still further aspect of the invention, a signal embodied in a carrier wave is provided. The signal represents sequences of instructions which, when executed by at least one processor, cause the at least one processor to facilitate circuitry design by performing a plurality of steps including receiving input preliminary design specifications and goals into a processing system, predicting subsystem performance based on input design parameters and providing alternative subsystem designs based on the input design specifications and input goals if requested and estimating power consumption and density based on the input design parameters and providing additional design options upon request. The steps further include providing system tradeoff and option information based on the input goals, the input design specifications, and the output of the power consumption and density estimate and the subsystem performance sub-routine in order to provide minimum required technology for minimizing power consumption.

The present invention will now be described in more detail with reference to exemplary embodiments thereof as shown in the appended drawings. While the present invention is described below with reference to preferred embodiments, it should be understood that the present invention is not limited thereto. Those of ordinary skill in the art having access to the teachings herein will recognize additional implementations, modifications, and embodiments, as well as other fields of use, which are within the scope of the present invention as disclosed and claimed herein, and with respect to which the present invention could be of significant utility.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENT

Figure 1:
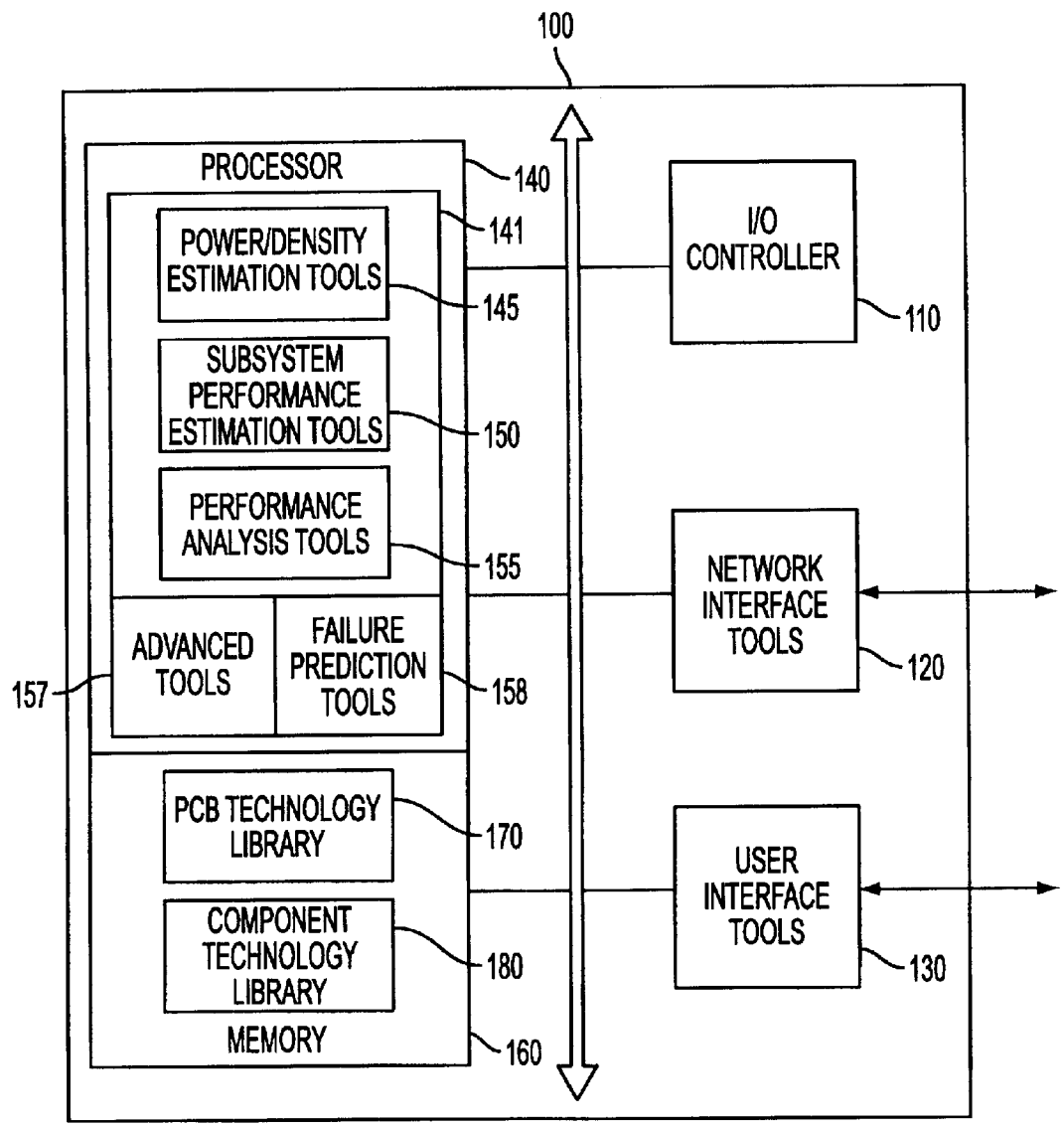
FIG. 1 is a block diagram showing a system for facilitating circuitry design in accordance with the present invention.

Referring to FIG. 1, there is shown a system 100 for facilitating the design of circuit boards and circuit components. The system 100 comprises known components such as an I/O controller 110, network interface tools 120, and user interface tools 130. The system further includes a processor 140 and a memory 160. The processor 140 must be capable of implementing estimation tools 141, which include power/density estimation tools 145, subsystem performance estimation tools 150, performance analysis tools 155, advanced tools 157, and failure prediction tools 158, all of which are typically software tools that may be implemented by a processor. The memory 160 can include any structure capable of storing a printed circuit board (PCB) technology library 170 and a component technology library 180. Alternatively, the system 100 could use network interface tools 120 to access a remote PCB technology library 170 and a remote component technology 180.

The subsystem performance estimation tools 150 are capable of processing input in the form of a component, e.g. Synchronous Dynamic Random Access Memory(SDRAM), Clock Data Recovery (CDR), Field Programmable Gate Array (FPGA), to choose for example, the type of interconnect that will be required to result in the least amount of power loss. The user must enter a goal such as the objective of finding an interconnect that minimizes power loss. The subsystem performance estimation tool 150 is able to perform this function by retrieving information from the PCB technology library 170 and calculating minimum power consumption based on the contents of the PCB technology library 170.

The subsystem performance estimation tool 150 is capable of achieving a number of user stated goals including calculating spacing between components in order to provide appropriate delay times. Another design feature that can be addressed by the subsystem performance estimation tool 150 includes impedance matching. In this instance, input values would include dimensions and input goals would include desired impedance. The subsystem performance estimation tools 150 would access the PCB technology library 170 to determine if the dimensions would give you the appropriate impedance for the line. If the conclusion is negative, the subsystem performance estimation tool 150 can provide alternative dimensions. Of course, the ultimate result is a minimization of power loss in an interconnect. Other user stated goals that the subsystem performance estimation tool 150 can achieve include maximizing signal speed, performing electromagnetic analysis and facilitating heatsink selection. Electromagnetic analysis will require an interconnect input and heatsink analysis will require component inputs.

The subsystem performance estimation tools 150 operate on subsystems. Subsystems fall into several categories including: chip level; board level; shelf level; bay level; and electrical characteristics. It is important that analysis begins with the lower level subsystems because changes on the lowest level will propagate through the entire system and impact overall performance.

For example, in order to perform shelf level analysis, a user could input to the performance estimation tools 150 parameters such as the number of boards, the type of power supply, and the dimensions of the shelf. From the shelf dimensions, performance estimation tools 150 can determine how much air will be needed to cool the entire shelf. Based on the amount of air required to cool the shelf, the performance estimation tools 150 can extract information from the PCB technology library 170 to obtain a selection of appropriate fans. The library contains information regarding three different techniques for cooling the shelf including forced air, propellers, and liquid cooling. The selection of fans may include a series of fans or may be only one fan. Based on the input information, the performance estimation tools 150 also calculate additional power requirements. At the shelf level, different types of rectifiers may be required to deliver the power to the boards. Based on the amount of power required, the performance estimation tools 150 can select a selection of rectifiers from the PCB technology library 170.

Once the aforementioned components have been selected, the user can advance to bay level analysis, during which the performance estimation tools 150 determine how much power the system will consume and give the user entire throughput capabilities for the system.

After the bay level analysis, the performance estimation tools 150 can advance to an office level analysis. A primary purpose of the office level analysis is to determine how to position equipment and minimize cabling by properly arranging the bays. The office level analysis gives the user the real estate need to accomplish the required throughput and temperature and further is able to predict equipment behavior in the event of failure. In the office level analysis, the user inputs the number of bays or throughput and the dimensions of the room. The performance estimation tools 150 are able to calculate required bay spacing, required cable length, and room temperature under normal condition with the specified number of bays. The performance estimation tools 150 then output the bay arrangement, cable lengths, and required temperature to maintain the system in a proper operational mode.

The power/density estimation tools 145 also accept component input, but the output comprises a power, throughput, or density estimate. The input to the power/density estimation tools can further comprise additional factors such as the number of transistors in a chip, the chip's speed, its supply voltage, and the number of inputs and outputs. From this information, the power/density estimation tools 145 can approximate the amount of power that the chip will consume. The power/density estimation tool 145 can split the power estimate into core power (the power required by the transistor) and line drive power. The power/density estimation tool 145 can further provide advice on techniques for reducing overall chip power. Thus, the power/density estimation tool 145 can provide power consumption estimates for components individually or for the entire circuit board or system.

In order to make its estimates, the power/density estimation tool 145 accesses the component technology library 180. The component technology library 180 preferably contains power consumption information related to different types of components.

Ultimately, information is exchanged between the power/density estimation tool 145 and the subsystem performance tool 150 so that a list of optimized materials, components, and/or dimensions is reached. The list is then sent to the performance analysis tools 155. The performance analysis tools 155 provide a board level analysis, preferably including an analysis of power consumption, throughput, and density data. The performance analysis tools 155 may provide additional board level options.

When a user selects a design, the user can elect to analyze the design further using the advanced tools 157.

The advanced tools 157 enable the user to visualize the board layout by showing component locations and approximate distances between components. The component layout can also be shown with or without microvias or embedded passive components. The advanced tools 157 preferably also provide the user with the ability to change components and simultaneously change the visual layout displayed. The advanced tools are preferably also capable of performing shelf level and bay level display and analysis.

Also, upon selecting a design, the user may want to implement predictive testing using the predictive testing tools 158. The predictive testing tools 158 are particularly useful once a user has selected embedded passive components to determine potential results if the power going throw the embedded passive components is higher than the required power. The user inputs the board type and new technologies on the board. The failure prediction tools 158 can predict thermal behavior at conditions which are exceed normal operating power and temperature, thereby predicting results such as board overheating or charring of dielectric material. The failure prediction tools 158 will access the PCB technology library 170 to suggest a material with better suited properties if such a material is detected. More suitable materials can be determined by accessing thermal expansion coefficients of appropriate materials. The failure prediction tools 158 are primarily used at the board level.

The system 100 may comprise a personal computer running the Microsoft Windows™ 95, 98, Millenium™, NT™, or 2000, Windows™ CE™, PalmOS™, Unix, Linux, Solaris™, OS/2™, BeOS™, MacOS™ or other operating system or platform. The processor 140 may include a microprocessor such as an Intel x86-based device, a Motorola 68K or PowerPC™ device, a MIPS, Hewlett-Packard Precision™, or Digital Equipment Corp. Alpha™ RISC processor, a microcontroller or other general or special purpose device operating under programmed control.

The memory 160 may include electronic memory such as RAM (random access memory) or EPROM (electronically programmable read only memory), storage such as a hard drive, CDROM or rewritable CDROM or other magnetic, optical or other media, and other associated components connected over an electronic bus, as will be appreciated by persons skilled in the art.

The technology libraries 170 and 180 may comprise databases that may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

Figure 2:
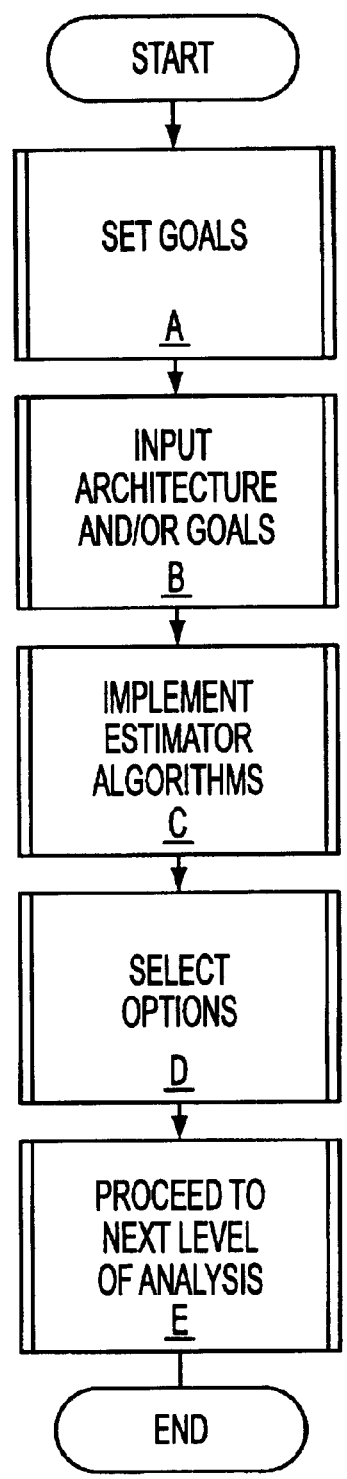
FIG. 2 is a flow chart illustrating the procedures used in an embodiment of the invention.

The method of the invention is further illustrated in FIGS. 2–6. FIG. 2 is a flow chart illustrating the procedures of an embodiment of the invention. In procedure A, the user sets goals such as office goals or equipment goals which frequently include goals such as minimizing power consumption, increasing density, reducing size, increasing signal speed, and decreasing cost. On a more specific level, the user may formulate specific components that are suitable for use in the project.

In procedure B, the user inputs architecture and/or desired goals. The user can simply input components or can further input a desired maximum power consumption, size, density, or throughput etc.

In procedure C, estimation tools 141 are implemented. Based on the input, the system 100 can provide estimates related to power, throughput, and density. The system can further provide delay information, heatsink information, spacing information, impedance information, technology and material selection information. As will further be described below in reference to FIGS. 3–5, the estimation tools 141 present the user with a plurality of design options.

In procedure D, the user selects desired options presented by the tools 141. After selecting options in procedure D, the user can proceed to the next level of analysis in procedure E. As stated above in reference to the system components, the user begins with chip level analysis, proceeds next to board level analysis, then to shelf level analysis, to bay level analysis, and finally to office level analysis. It is important that analysis begins with the lower level subsystems because changes on the lowest level will propagate through the entire system and impact overall performance. While the functioning of the system is explained below primarily with reference to chip and board level analysis, the system functions similarly, using the same tools, for all levels of analysis.

Figure 3:
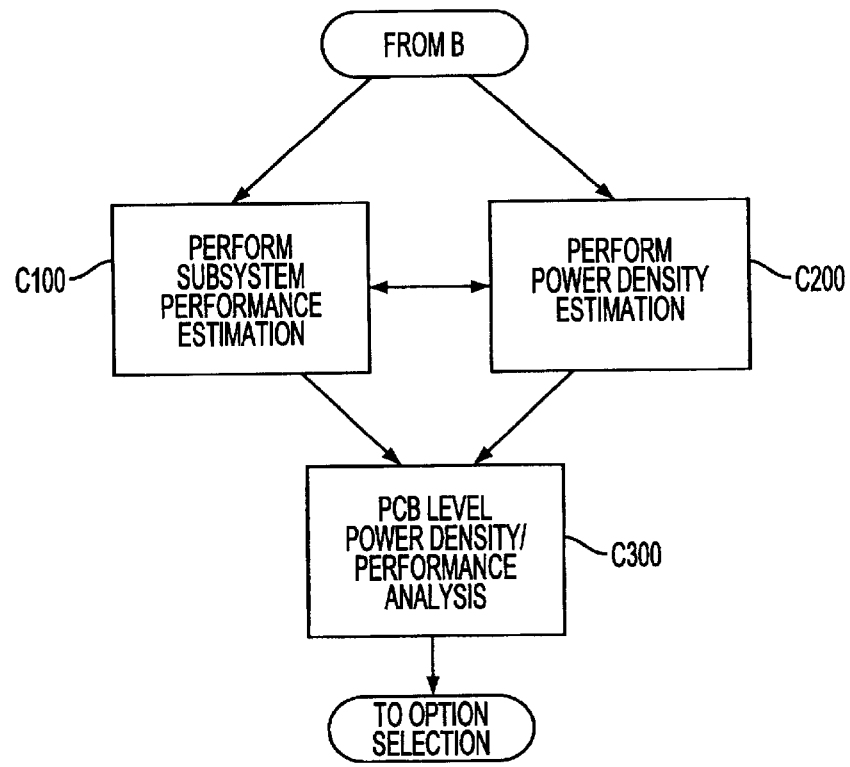
FIG. 3 is a flow chart illustrating the operation of the estimation tools in an embodiment of the invention.

FIG. 3 illustrates the interaction of the power/density estimation tools 145, the subsystem performance estimation tools 150 and the performance analysis tools 155. The subsystem performance estimation tools 145 and the power/density analysis tools 150 combine information to reach a board level analysis for the performance analysis tools 155.

Figure 4:
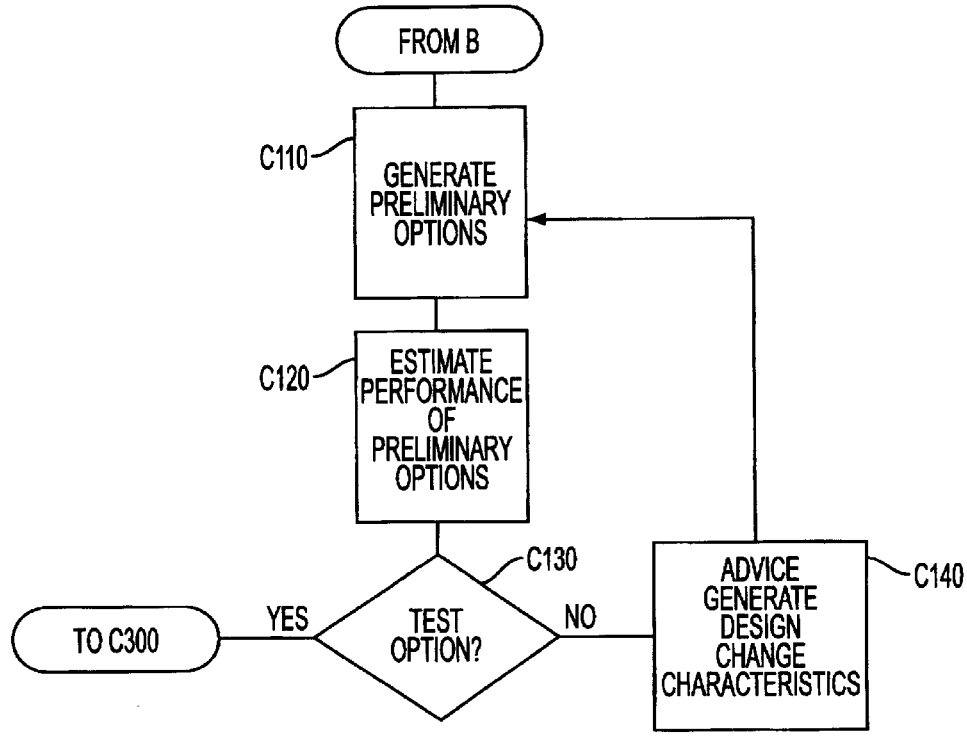
FIG. 4 is a flow chart illustrating the steps involved in predicting subsystem performance.

FIG. 4 illustrates the procedures involved in the subsystem performance estimation procedure C100. Based on input from procedure B, the subsystem performance estimation tools generate preliminary options (such as alternative components) in step C110. The options generated will depend upon the goals and components input by the user. The performance of the options is evaluated in step C120. The user can choose to test an option that appears desirable in step C130 or can continue to C140 to generate design change characteristics and have further analysis provided and advice provided.

Figures 6A, 6B:
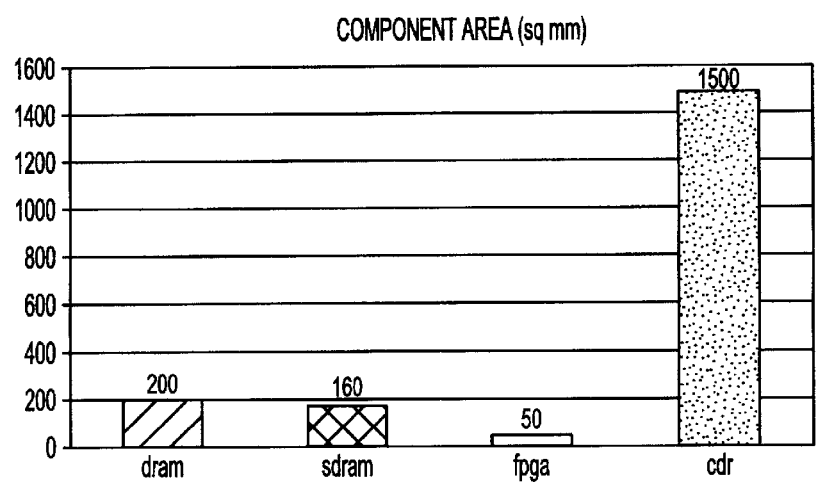
FIG. 6A is a spreadsheet showing sample input and output.
FIG. 6B is a graph showing sample system output and tradeoff information.

FIGS. 6A and 6B illustrate sample input and output from the subsystem performance estimation tools 145. As shown in FIG. 6A, the user would be required to enter at least a component name in the first column. The user would also request a goal, such as density analysis or power analysis. Optionally, the user may input other displayed values and may request alternative goals such as material selection, impedance data, cooling information or electromagnetic analysis. The system provides comparable components and provides information about each component including its area. As shown in FIG. 6B, the subsystem performance estimation tools 145 can show the area graphically. The graphical output is advantageous because it becomes immediately clear that the clock data recovery chips take up the most space. In response, the user could replace the CDR with something smaller or could combine the CDR function into the DRAM or SDRAM.

Figure 5:
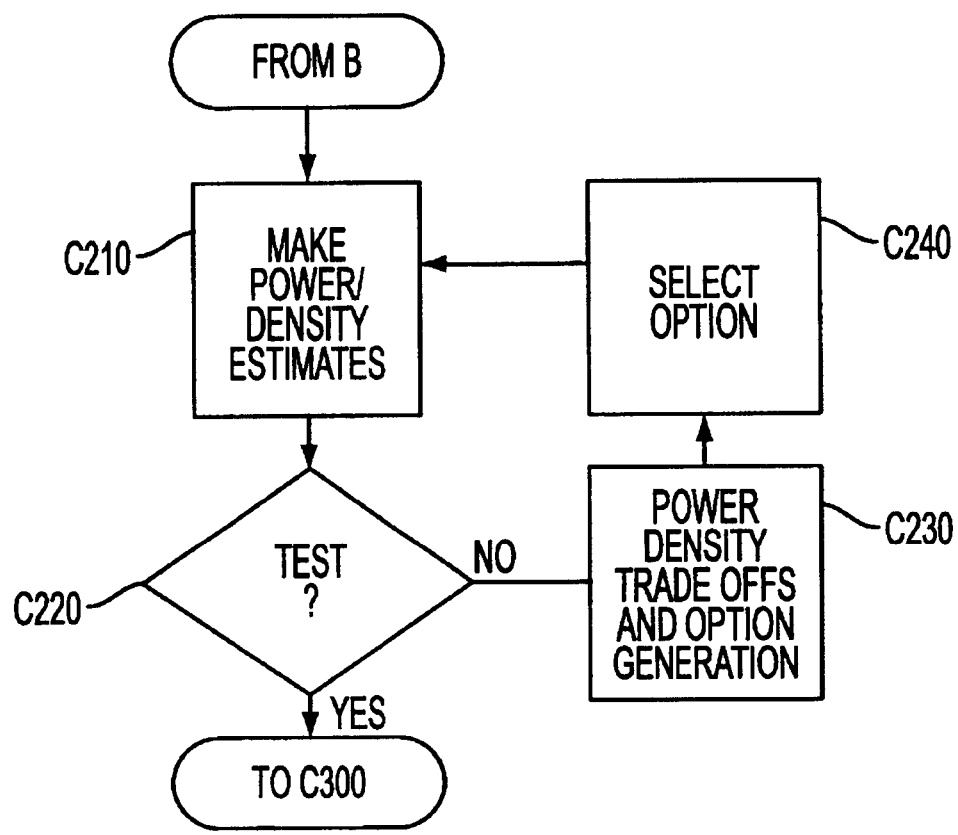
FIG. 5 is a flow chart illustrating the steps involved in the power and density performance estimation.
Figure 6C:
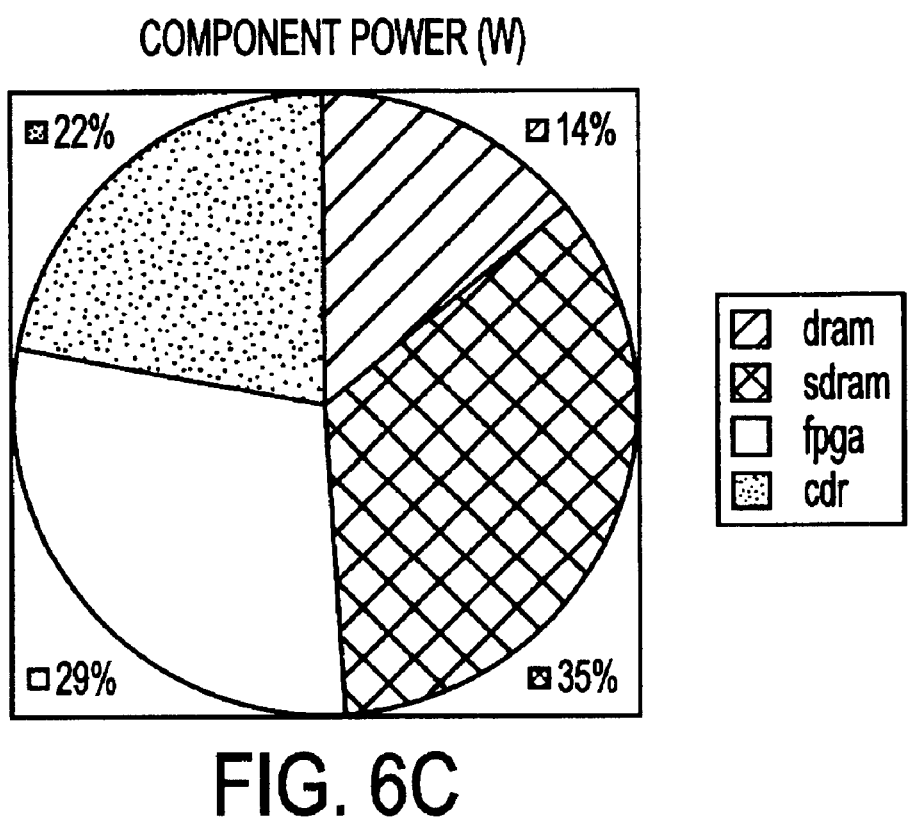
FIG. 6C is an additional graph showing sample system output and tradeoff information.

FIG. 5 illustrates the operation of the power/density estimation tools 145. In step C210, the tool makes power/density estimates based on input components. In step C220, the user can elect to test the configuration or alternatively go to step C230 to generate tradeoffs and options. In step C240, the user selects an option and the power/density estimation tools repeat the process. Sample output of the power/density estimation tools is shown in FIG. 6C. The chart illustrates the power consumption by component of a variety of different components.

It is after use of the power density estimation tools 145 and the subsystem performance estimation tools 150, that the user can utilize performance analysis tools 155 for evaluating the performance of a system at a board level. From the analysis, the user can proceed if desired to use the advanced tools 157 to visualize the board layout and make additional changes.

Through the use of the tools described above, the system 100 aims to provide minimum power consumption using minimum required technology. In other words, the system 100 provides the user with the data to select a configuration that consumes minimum power with a simple, inexpensive, and easy to manufacture configuration.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breadth and spirit of the present invention as disclosed herein.

What is claimed is:

1. A method for facilitating circuitry design, the method comprising the steps of:
   receiving preliminary design specifications and goals, wherein the design specifications and goals comprise dimensions and an impedance goal;
   predicting subsystem performance using an impedance calculation based on the design specifications, and providing alternative subsystem designs based on the goals if requested;
   estimating power consumption based on the design specifications, and providing additional design options upon request; and
   providing system tradeoff and option information based on the goals, the design specifications, the power consumption estimate, and the subsystem performance prediction in order to provide minimum required technology for minimizing power consumption.

2. The method of claim 1, further comprising estimating density and throughput.

3. The method of claim 1, wherein receiving goals comprises receiving a signal speed goal and predicting subsystem performance comprises calculating spacing between components to provide appropriate delay times.

4. The method of claim 1, wherein receiving preliminary design specifications and goals comprises receiving component specifications and a reduced power consumption goal and predicting subsystem performance comprises providing power consumption analysis.

5. The method of claim 1, further comprises providing a visual board layout using advanced tools.

6. The method of claim 1, further comprising changing the visual board layout upon receiving a user request.

7. At least one signal embodied in at least one carrier wave for transmitting a computer program of instructions configured to be readable by at least one processor for instructing the at least one processor to execute a computer process for performing the method as recited in claim 1.

8. At least one processor readable carrier for storing a computer program of instructions configured to be readable by at least one processor for instructing the at least one processor to execute a computer process for performing the method as recited in claim 1.

9. A system for facilitating circuitry design, the system comprising:
   user interface tools for allowing a user to input preliminary design specifications and goals, wherein the design specifications and goals comprise dimensions and an impedance goal;
   at least one technology library for storing printed circuit board and component data, wherein the printed circuit board and component data include power consumption information; and
   processing tools for implementation on a processor, the processing tools comprising power and density estimation tools, subsystem performance estimation tools, and system performance analysis tools, wherein the subsystem performance estimation tools predict subsystem performance using an impedance calculation based on the design specifications.

10. The system of claim 9, wherein the at least one technology library comprises a PCB technology library and a component technology library.

11. The system of claim 10, wherein the subsystem performance estimation tools include means for extracting data from the component technology library and the power and density estimation tools comprise means for extracting information from the PCB technology library.

12. The system of claim 9, wherein the power and density estimation tools comprise means for estimating power consumption, density, and throughput based on component input.

13. The system of claim 9, wherein the subsystem performance estimation tools comprise means for processing input goals and component data in order to provide an analysis.

14. The system of claim 13, wherein means for processing input goals and providing an analysis comprises means for receiving a reduced power consumption goal and providing power consumption analysis.

15. The system of claim 9, further comprising advanced tools for visualizing board layout.

16. The system of claim 9, wherein the performance analysis tools comprise means for performing a board level analysis.

17. The system of claim 9, wherein the performance analysis tools include means for providing a board level analysis.

18. A method for facilitating system design, the method comprising the steps of:
   receiving preliminary design specifications and goals, wherein the design specifications and goals comprise dimensions and an impedance goal;

predicting subsystem performance using an impedance calculation based on the design specifications, and providing alternative subsystem designs based on the goals;

selecting a subsystem design; and advancing to a next level of analysis using the selected subsystem design as input.

19. The method of claim 18, performing the prediction of subsystem performance step for circuit level of analysis and repeating the subsystem performance prediction step for at least one of a board level analysis, a shelf level analysis, a bay level analysis, and an office level analysis.

20. The method of claim 18, further comprising the step of providing system tradeoff and option information based on the goals, the design specifications, a power consumption and density estimate, and the subsystem performance prediction in order to provide minimum required technology for minimizing power consumption.

21. At least one signal embodied in at least one carrier wave for transmitting a computer program of instructions configured to be readable by at least one processor for instructing the at least one processor to execute a computer process for performing the method as recited in claim 18.

22. At least one processor readable carrier for a computer program of instructions configured to be by at least one processor for instructing the at least one processor to execute a computer process for performing the recited in claim 18.

23. A method for facilitating circuitry design, the method comprising the steps of:

receiving preliminary design specifications and goals, wherein the design specifications and goals comprise interconnect data and an electromagnetic analysis goal;

predicting subsystem performance using an electromagnetic analysis based on the design specifications, and providing alternative subsystem designs based on the goals if requested;

estimating power consumption based on the design specifications, and providing additional design options upon request; and providing system tradeoff and option information based on the goals, the design specifications, the power consumption estimate, and the subsystem performance prediction in order to provide minimum required technology for minimizing power consumption.

24. At least one signal embodied in at least one carrier wave for transmitting a computer program of instructions configured to be readable by at least one processor for instructing the at least one processor to execute a computer process for performing the method as recited in claim 23.

25. At least one processor readable carrier for storing a computer program of instructions configured to be readable by at least one processor for instructing the at least one processor to execute a computer process for performing the method as recited in claim 23.

26. A method for facilitating circuitry design, the method comprising the steps of:

receiving preliminary design specifications and goals, wherein the design specifications and goals comprise component characteristics and a heatsink analysis goal;

predicting subsystem performance using a heatsink analysis based on the design specifications, and providing alternative subsystem designs based on the goals if requested;

estimating power consumption based on the design specifications, and providing additional design options upon request; and providing system tradeoff and option information based on the goals, the design specifications, the power consumption estimate, and the subsystem performance prediction in order to provide minimum required technology for minimizing power consumption.

27. At least one signal embodied in at least one carrier wave for transmitting a computer program of instructions configured to be readable by at least one processor for instructing the at least one processor to execute a computer process for performing the method as recited in claim 26.

28. At least one processor readable carrier for storing a computer program of instructions configured to be readable by at least one processor for instructing the at least one processor to execute a computer process for performing the method as recited in claim 26.

29. A system for facilitating circuitry design, the system comprising:

user interface tools for allowing a user to input preliminary design specifications and goals, wherein the design specifications and goals comprise interconnect data and an electromagnetic analysis goal;

at least one technology library for storing printed circuit board and component data, wherein the printed circuit board and component data include power consumption information; and processing tools for implementation on a processor, the processing tools comprising power and density estimation tools, subsystem performance estimation tools, and system performance analysis tools, wherein the subsystem performance estimation tools predict subsystem performance using an electromagnetic analysis based on the design specifications.

30. A system for facilitating circuitry design, the system comprising:

user interface tools for allowing a user to input preliminary design specifications and goals, wherein the design specifications and goals comprise component characteristics and a heatsink analysis goal;

at least one technology library for storing printed circuit board and component data, wherein the printed circuit board and component data include power consumption information; and processing tools for implementation on a processor, the processing tools comprising power and density estimation tools, subsystem performance estimation tools, and system performance analysis tools, wherein the subsystem performance estimation tools predict subsystem performance using a heatsink analysis based on the design specifications.

31. A method for facilitating system design, the method comprising the steps of:

receiving preliminary design specifications and goals, wherein the design specifications and goals comprise interconnect data and an electromagnetic analysis goal;

predicting subsystem performance using an electromagnetic analysis based on the design specifications, and providing alternative subsystem designs based on the goals;

selecting a subsystem design; and advancing to a next level of analysis using the selected subsystem design as input.

32. At least one signal embodied in at least one carrier wave for transmitting a computer program of instructions configured to be readable by at least one processor for instructing the at least one processor to execute a computer process for performing the method as recited in claim 31.

33. At least one processor readable carrier for storing a computer program of instructions configured to be readable by at least one processor for instructing the at least one processor to execute a computer process for performing the method as recited in claim 31.

34. A method for facilitating system design, the method comprising the steps of:

receiving preliminary design specifications and goals, wherein the design specifications and goals comprise component characteristics and a heatsink analysis goal;

predicting subsystem performance using a heatsink analysis based on the design specifications, and providing alternative subsystem designs based on the goals;

selecting a subsystem design; and advancing to a next level of analysis using the selected subsystem design as input.

35. At least one signal embodied in at least one carrier wave for transmitting a computer program of instructions configured to be readable by at least one processor for instructing the at least one processor to execute a computer process for performing the method as recited in claim 34.

36. At least one processor readable carrier for storing a computer program of instructions configured to be readable by at least one processor for instructing the at least one processor to execute a computer process for performing the method as recited in claim 34.

* * * * *